(12) United States Patent
Huang et al.

(10) Patent No.: US 10,675,643 B2
(45) Date of Patent: Jun. 9, 2020

(54) WATER DISCHARGE STRUCTURE HAVING RESET FUNCTION AND A PULL-OUT HEAD HAVING A WATER DISCHARGE STRUCTURE

(71) Applicant: KaiPing HanShun Sanitary Ware Industrical Co.Ltd, Kaiping (CN)

(72) Inventors: Feiwu Huang, Kaiping (CN); Zhengzhen Lei, Kaiping (CN); Qingquan Lai, Kaiping (CN); Si Zhou, Kaiping (CN)

(73) Assignee: KAIPING HANSHUN SANITARY WARE INDUSTRIAL CO LTD, Kaiping (CN)

( * ) Notice: Subject to any disclaimer, the term of this patent is extended or adjusted under 35 U.S.C. 154(b) by 51 days.

(21) Appl. No.: 15/694,855

(22) Filed: Sep. 4, 2017

(65) Prior Publication Data

US 2019/0003165 A1    Jan. 3, 2019

(51) Int. Cl.
*B05B 1/16* (2006.01)
*E03C 1/23* (2006.01)
(Continued)

(52) U.S. Cl.
CPC .......... *B05B 1/1618* (2013.01); *B05B 1/3013* (2013.01); *B05B 12/002* (2013.01); *E03C 1/0405* (2013.01); *E03C 1/2304* (2013.01); *F16K 11/0445* (2013.01); *F16K 31/52416* (2013.01); *F16K 31/56* (2013.01);
(Continued)

(58) Field of Classification Search
CPC .... E03C 1/2304; E03C 1/0404; E03C 1/0405; F16K 31/52416; F16K 31/56; F16K 31/566; F16K 11/0445; B05B 1/1618; B05B 1/1609; B05B 1/16; B05B 12/002
See application file for complete search history.

(56) References Cited

U.S. PATENT DOCUMENTS

| 6,085,790 A * | 7/2000 | Humped | B05B 1/1618 |
| | | | 137/801 |
| 6,290,147 B1 * | 9/2001 | Bertrand | B05B 1/1618 |
| | | | 239/444 |

(Continued)

FOREIGN PATENT DOCUMENTS

| DE | 102013009194 A1 * | 12/2013 | F16K 31/56 |
| WO | WO-2013091463 A1 * | 6/2013 | F16K 31/60 |

*Primary Examiner* — Reinaldo Sanchez-Medina
*Assistant Examiner* — David Colon-Morales
(74) *Attorney, Agent, or Firm* — Gokalp Bayramoglu

(57) ABSTRACT

The present invention discloses a water discharge structure having a reset function which includes a body internally provided with a water flowing channel, a water outflow end of the body is provided with a first water outflow channel and a second water outflow channel; a button arranged on the body, and a reset spring arranged between the button and the body; a movable element coupled with and fitting the button; and a center shaft coupled with and fitting the movable element, an end of the center shaft is provided with a blocking element, a third spring is provided between an end of the center shaft and the body, and the body is internally provided with a reset device to drive the movable element to reset. A pull-out head includes the above-mentioned water discharge structure having a reset function, and the present invention has the function of memory.

18 Claims, 28 Drawing Sheets

(51) Int. Cl.
*F16K 31/56* (2006.01)
*B05B 12/00* (2018.01)
*E03C 1/04* (2006.01)
*F16K 11/044* (2006.01)
*B05B 1/30* (2006.01)
*B05B 1/18* (2006.01)
*F16K 31/524* (2006.01)

(52) U.S. Cl.
CPC .............. *F16K 31/566* (2013.01); *B05B 1/18* (2013.01); *E03C 2001/2311* (2013.01); *E03C 2001/2317* (2013.01)

(56) References Cited

U.S. PATENT DOCUMENTS

| | | | | |
|---|---|---|---|---|
| 6,370,713 B2 * | 4/2002 | Bosio | B05B 1/1618 | 4/677 |
| 6,619,567 B1 * | 9/2003 | Ouyoung | E03C 1/0404 | 137/625.48 |
| 6,738,996 B1 * | 5/2004 | Malek | B05B 1/1618 | 239/441 |
| 6,808,131 B2 * | 10/2004 | Bosio | E03C 1/04 | 239/447 |
| 7,000,854 B2 * | 2/2006 | Malek | B05B 1/1618 | 137/625.48 |
| 7,344,095 B1 * | 3/2008 | Hsu | B05B 1/1618 | 239/444 |
| 7,380,731 B1 * | 6/2008 | Hsu | B05B 1/1618 | 239/391 |
| 7,607,588 B2 * | 10/2009 | Nobili | B05B 1/1618 | 137/613 |
| 7,909,269 B2 * | 3/2011 | Erickson | B05B 1/1618 | 137/801 |
| 8,091,806 B2 * | 1/2012 | Huang | B05B 1/1618 | 239/390 |
| 8,727,241 B2 * | 5/2014 | Bosio | B05B 1/1618 | 239/525 |
| 9,061,307 B2 * | 6/2015 | Klicpera | B05B 1/18 | |
| 9,175,459 B2 * | 11/2015 | Zhang | B05B 1/1618 | |
| 9,272,295 B2 * | 3/2016 | Esche | B05B 1/1618 | |
| 9,404,243 B2 * | 8/2016 | Cacka | B05B 1/1654 | |
| 9,512,602 B2 * | 12/2016 | Lei | E03C 1/08 | |
| 9,895,702 B2 * | 2/2018 | Lei | B05B 1/12 | |
| 10,066,374 B2 * | 9/2018 | Wu | E03C 1/0404 | |
| 2005/0189438 A1 * | 9/2005 | Bosio | B05B 1/1618 | 239/443 |
| 2006/0016912 A1 * | 1/2006 | Nobili | B05B 1/1618 | 239/525 |
| 2007/0018019 A1 * | 1/2007 | Nobili | B05B 12/004 | 239/581.1 |
| 2007/0221760 A1 * | 9/2007 | Nobili | B05B 12/0024 | 239/569 |
| 2008/0302886 A1 * | 12/2008 | Hodel | B05B 1/1618 | 239/443 |
| 2010/0038446 A1 * | 2/2010 | Mora | B05B 1/18 | 239/99 |
| 2010/0155639 A1 * | 6/2010 | Zhou | B05B 1/1609 | 251/213 |
| 2017/0100728 A1 * | 4/2017 | Gong | B05B 1/1636 | |

* cited by examiner

WATER DISCHARGE STRUCTURE HAVING RESET FUNCTION AND A PULL-OUT HEAD HAVING A WATER DISCHARGE STRUCTURE

CROSS REFERENCE TO RELATED APPLICATIONS

This application claims priority to Chinese Patent Application No. 201710498656.4, filed on Jun. 28, 2017, the entire content of which is incorporated herein by reference.

TECHNICAL FIELD

The present invention relates to a water discharge structure having reset function and a pull-out head having a water discharge structure.

BACKGROUND

In the existing products for kitchen & bathroom and pipes, most of structures having a single button to switch between two functions include a long strip shaped seesaw structure and a structure similar to a ball-point pen. Even though the seesaw structure can realize a memory function, it is unattractive and inconvenient to operate, and needs more space to accommodate the button at the location where this structure is applied. The structure of ball-point pen may have an aesthetic appearance. Further, it is convenient to switch, and require less space for the button. However, this structure cannot realize the memory function.

SUMMARY OF THE INVENTION

In order to solve the above-mentioned technical problems, the objectives of the present invention are to provide a water discharge structure having a reset function and a pull-out head thereof.

The present invention is achieved by the following technical solutions.

A water discharge structure having reset function comprises: a body, the body is internally provided with a water flowing channel, and a water outflow end of the body is provided with a first water outflow channel and a second water outflow channel; a button, the button is arranged on the body, a reset spring is arranged between the button and the body; a movable element, the movable element is coupled with and fits the button to achieve the movement of the movable element; and a center shaft, the movable element is coupled with and fits the center shaft. An end of the center shaft is provided with a blocking element to control the opening and closing of the first water outflow channel or the second water outflow channel, and a third spring is provided between an end of the center shaft and the body. The body is internally provided with a reset device to drive the movable element to reset.

In the embodiment of the present invention, the reset device includes a first spring and a second spring, the first spring and second spring are arranged around the center shaft located on both the left and right sides of the movable element. A movable plug is arranged around the other end of the center shaft. The body is further provided with a water channel to connect the first water outflow channel to the movable plug. An end of the first spring is coupled with an end of the movable element, and the other end of the first spring is coupled with the movable plug. An end of the second spring is coupled with the other end of the movable element, and the other end of the second spring is coupled with the body.

In the embodiment of the present invention, the reset device includes a first magnet located at the other end of the center shaft. The body is further provided with a magnetic element which attracts and fits the first magnet. The body is provided with a space in which the magnetic element moves. An end of the first spring is coupled with an end of the movable element. The other end of the first spring is coupled with the magnetic element. An end of the second spring is coupled with the other end of the movable element, and the other end of the second spring is coupled with the body.

In the embodiment of the present invention, the center shaft is provided with an annular recess, the movable element is arranged within and around the annular recess.

In the embodiment of the invention, the reset device includes a fourth spring arranged around the center shaft. An annular piece is arranged at the middle of the center shaft, and the fourth spring is arranged between the annular piece and the body. A fixing piece is arranged around the center shaft located between the annular piece and a center plug, and the fixing piece is fastened to the body. A fifth spring is arranged between the fixing piece and the center plug. A water flowing port is arranged between the fixing piece and the center shaft, and the water flowing port is configured to guide the water flow to the annular piece.

In the embodiment of the present invention, a first inclined surface and a second inclined surface are provided at the lower portion of the button on the left and right sides respectively, and the lower ends of the first inclined surface and the second inclined surface are coupled to each other. A third inclined surface and a fourth inclined surface are provided at the upper portion of the movable element on the left and right sides respectively, and the upper ends of the third inclined surface and the fourth inclined surface are coupled to each other. The third inclined surface fits the second inclined surface, and the fourth inclined surface fits the first inclined surface.

In the embodiment of the present invention, a first arc surface is provided at the lower portion of the button, a second arc surface is provided at the upper portion of the movable element, and the second arc surface fits the first arc surface. One side of the first arc surface fits the other side of the second arc surface, and the other side of the first arc surface fits one side of the second arc surface.

In the embodiment of the invention, the body is internally provided with a cavity for mounting the center shaft. A sealing element is provided between the movable plug and the cavity. The other end of sealing element is arranged around the center shaft located at the other end of the cavity.

In the embodiment of the present invention, the center shaft located in the first water outflow channel is provided with the sealing element. A fixing ring is arranged around the center shaft located between the sealing element and the blocking element.

The present invention also discloses the following technical features.

A pull-out head including the water discharge structure having the reset function as described above is provided.

In the embodiment of the present invention, the pull-out head further includes a housing peripherally arranged around the body, and the housing is provided with an aerator connected to the first water outflow channel. The housing is provided with shower water outflow holes connected to the second water outflow channel.

The water discharge structure having a reset function and the pull-out head thereof of the present invention have the following advantages. A memory function can be realized, the structure is compact so that the product has a better appearance. Further, it is convenient to switch, and needs less space for the button.

BRIEF DESCRIPTION OF THE DRAWINGS

In order to illustrate the technical solutions of the present invention more clearly, drawings, which are required in the description of the embodiments or the prior art, will be briefly described hereinafter. Apparently, the drawings described hereafter are merely certain embodiments of the present invention. Other drawings may be derived from these drawings by those skilled in the art without inventive efforts.

DETAILED DESCRIPTION OF THE INVENTION

The technical solutions in the embodiments of the present invention will be clearly and fully described hereinafter based on the drawings in the embodiments of the present invention. Apparently, the described embodiments are merely certain embodiments rather than all the embodiments of the present invention. All other embodiments derived from the embodiments of the present invention by those of ordinary skill in the art without inventive efforts fall within the scope of the present invention.

The present invention mainly includes button 10, movable element 20, center shaft 30, and body 50, wherein a reset device is provided and configured to reset the movable element to the last state for the next switching.

With reference to FIGS. 1 to 13, a first embodiment of the present invention is provided.

Figure 1:
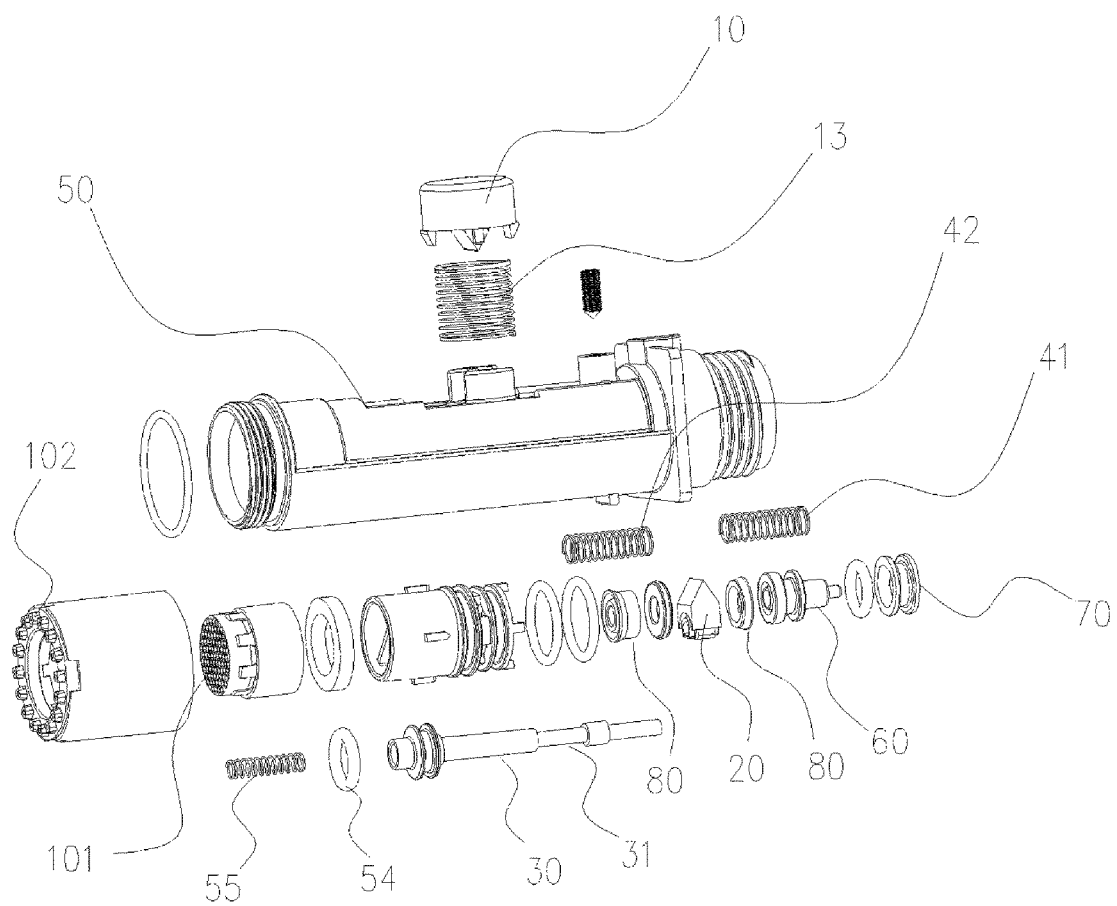
FIG. 1 is an exploded view of a water discharge structure having a reset function in the first embodiment of the present invention.

Referring to FIG. 1, a water discharge structure having a reset function mainly includes button 10, movable element 20, center shaft 30, and body 50. The specific products, to which the water discharge structure having a reset function is applied, are described hereafter. Taking a pull-out shower having a pull-out faucet as an example, the drawings are drawn to illustrate the water discharge structure having a reset function. However, the water discharge structure having the reset function provided by the present invention is not limited to the pull-out shower drawn in the drawings, and the water discharge structure having the reset function may be used in other products, such as three-way flow dividers, switching between tap water and purified water, top sprays, showers, spray guns, and so on.

Figure 28:
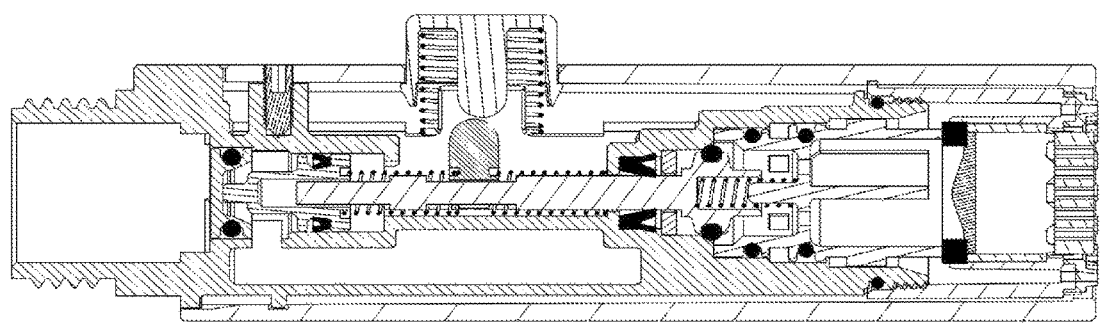
FIG. 28 is a schematic diagram of a water discharge structure having a reset function when the structure is not at work in the first embodiment of the present invention with a first arc surface provided at the lower portion of the button and a second arc surface provided at the upper portion of movable element.

Specifically, in one embodiment, first inclined surface 11 and second inclined surface 12 are provided at the lower portion of the button on the left and right sides respectively. The lower ends of first inclined surface and second inclined surface are coupled with each other. Reset spring 13 is provided on the button. For movable element 20, the movable element fits the button. Third inclined surface 21 and fourth inclined surface 22 are provided at the upper portion of the movable element on the left and right sides respectively. The upper ends of third inclined surface 21 and fourth inclined surface 22 are coupled with each other. Third inclined surface 21 fits second inclined surface 12, and fourth inclined surface 22 fits first inclined surface 11. In another embodiment, as shown in FIG. 28, a first arc surface is provided at the lower portion of the button, a second arc surface is provided at the upper portion of movable element, and the second arc surface fits the first arc surface. One side of the first arc surface fits the other side of the second arc surface, and the other side of the first arc surface fits one side of the second arc surface. That is to say, the lowest point of the first arc surface is staggered with the highest point of the second arc surface, and the lowest point of the first arc surface and the highest point of the second arc surface are not in a same vertical plane. Since the fitting mode of the first arc surface and the second arc surface is similar to the fitting mode of the four above-mentioned inclined surfaces, the fitting mode will not be illustrated in detail herein. For center shaft 30, movable element 20 fits center shaft 30 so that the movable element moves along the center shaft. First spring 41 and second spring 42 are arranged around the center shaft located on the left and right sides of the movable element. In an embodiment, the center shaft is provided with annular recess 31. Movable element 20 is arranged within and around annular groove 31. In this embodiment, the movable element moves between both ends of the annular recess, namely, both ends of the annular recess are the moving terminals of the movable element.

More specifically, the water discharge structure having a reset function further includes body 50 having water flowing channel 51. The water outflow end of the water flowing channel is provided with first water outflow channel 52 and second water outflow channel 53. In this embodiment, the water outflow end of the water flowing channel is provided with a flow divider. The first water outflow channel is located inside the flow divider, and the second water outflow channel is located in a gap between the flow divider and the body. One end of the center shaft is provided with blocking element 54 to control the opening and closing of the first water outflow channel or the second water outflow channel. In one embodiment, the blocking element is a seal ring, which is arranged around the center shaft. Third spring 55 is provided between one end of the center shaft and the body. The function of the third spring is to make the blocking element block the second water outflow channel after water is cut off for the product. When the water is supplied, water is discharged from the first water outflow channel, rather than from the second water outflow channel.

In a preferred embodiment of the present invention, movable plug 60 is arranged around the other end of the center shaft. The body is provided with a water passage 56 to connect the first water outflow channel to the movable plug. More specifically, an end of the first spring is coupled with an end of the movable element, and the other end of the first spring is coupled with the movable plug. An end of the second spring is coupled with the other end of the movable element, and the other end of the second spring is coupled with the body.

Furthermore, the body is internally provided with cavity 57 for mounting the center shaft. Sealing element 80 is provided between the movable plug and the cavity. The other end of sealing element 80 is arranged around the center shaft located at the other end of the cavity.

An end of the cavity fitting with the movable plug is provided with a plug 70. Alternatively, plug 70 may also be integrally formed with the body directly. The forward and backward movements of the movable plug are limited by the body and the plug, and the plug is fixed on the body and thus is unmovable.

Figure 2:
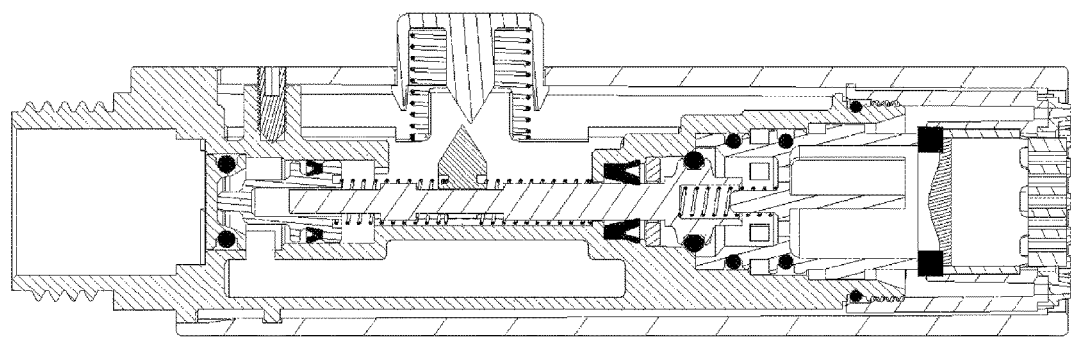
FIG. 2 is a schematic diagram of a water discharge structure having a reset function when the structure is not at work in the first embodiment of the present invention.
Figure 3:
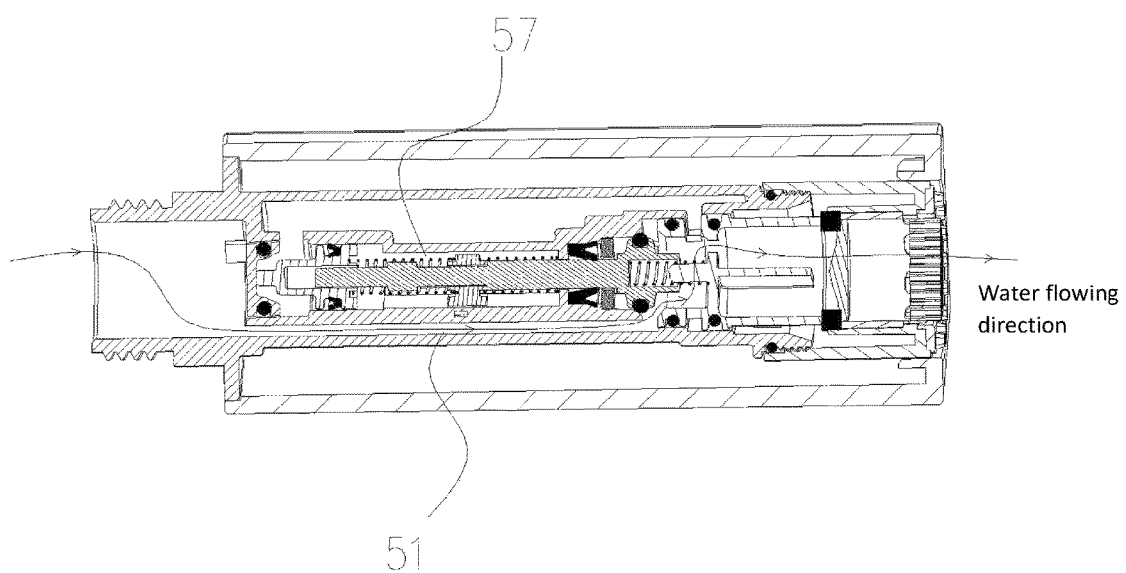
FIG. 3 is a water flow diagram of a water discharge structure having a reset function when the structure is not at work in the first embodiment of the present invention.

With reference to FIGS. 2 and 3, when the water discharge structure having a reset function is not at work (water is cut off), the work principle is provided below: Under the actions of the third spring exerting on the blocking element of the center shaft, the first water outflow channel is ensured to be open. Under the actions of the first spring and the second spring, the movable plug moves toward the left side until the limited position is reached, namely, an end of the movable plug contacts the plug. The highest point of the movable element is located on the left side of the lowest point of the button, and the first inclined surface is located above the fourth inclined surface, at this moment, the first water outflow channel remains open.

Figure 4:
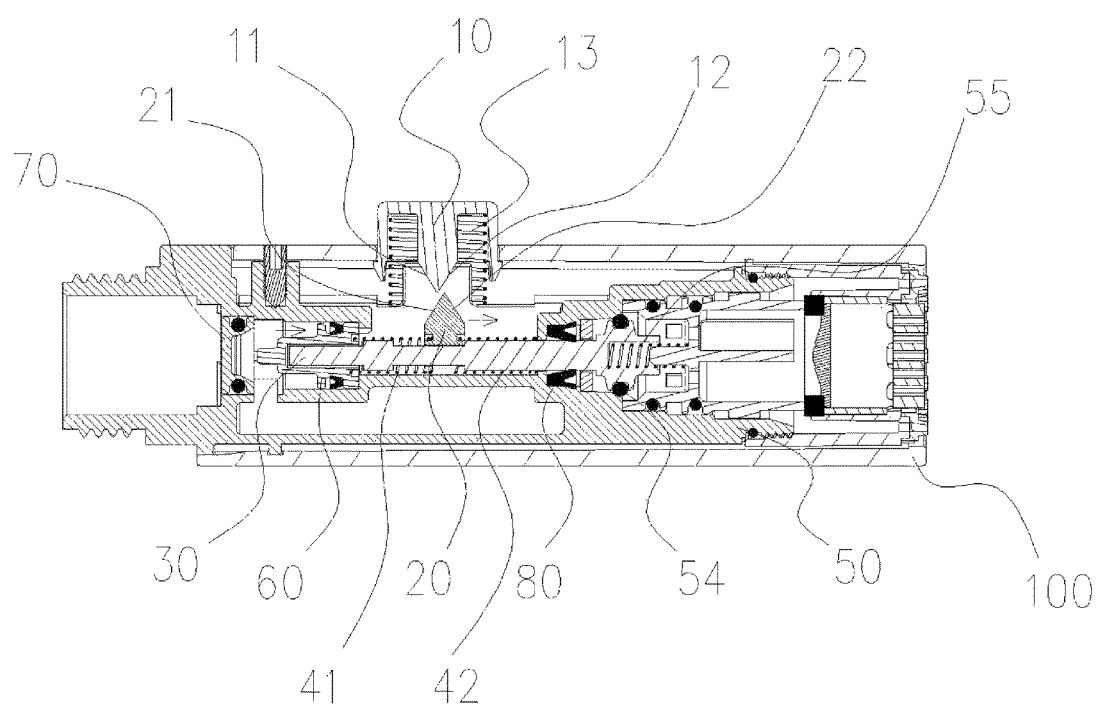
FIG. 4 is a schematic diagram of the first state of a water discharge structure having a reset function in the first embodiment of the present invention.
Figure 5:
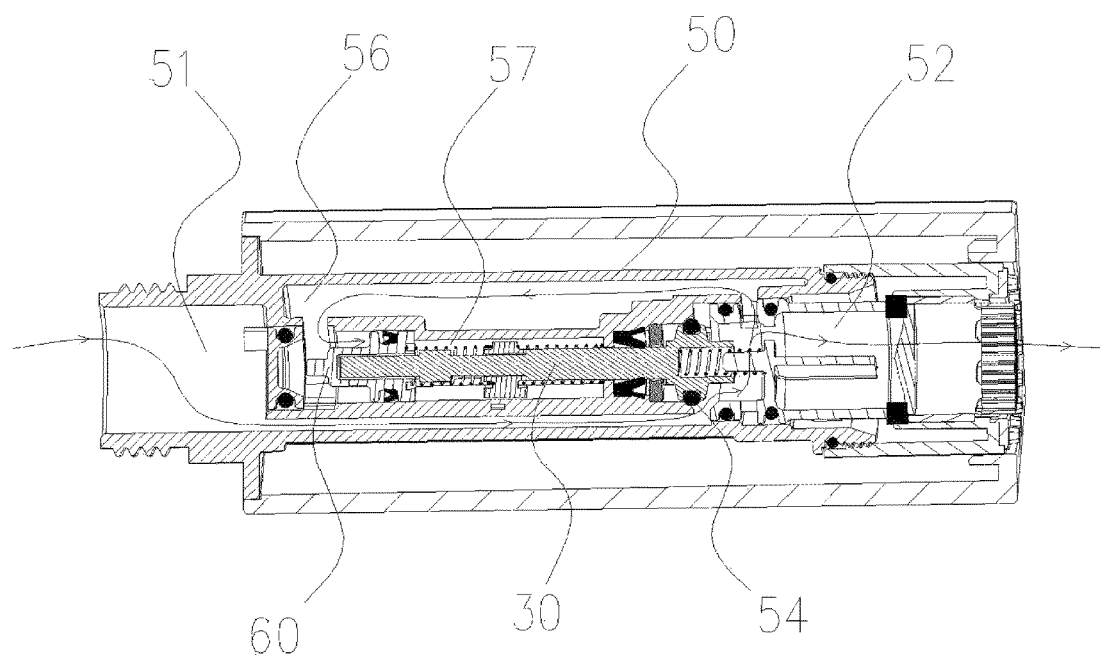
FIG. 5 is a flow diagram of the first state of a water discharge structure having a reset function in the first embodiment of the present invention.

With reference to FIGS. 4 and 5, when in a first state of the water discharge structure having a reset function, the work principle is provided below. The button is not pressed for switching (reset state). Under the action of the third spring exerting on the blocking element of the center shaft, the first water outflow channel is open. Meanwhile, under the action of the water pressure, the movable plug moves toward the right side until the limited position is reached, namely, the other end of the movable plug contacts the center shaft. The first spring and the second spring are compressed under the action of the movable plug, while the movable element moves under the actions of the first spring and the second spring, such that the second inclined surface is positioned above the third inclined surface to get ready to fit and be coupled.

Figure 6:
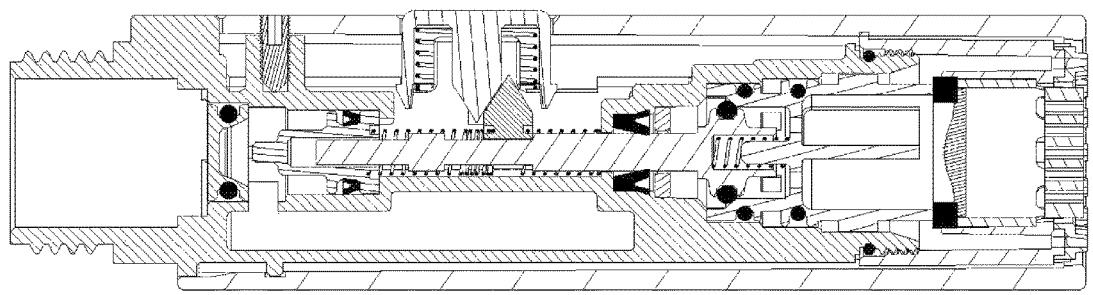
FIG. 6 is a schematic diagram of the second state of a water discharge structure having a reset function in the first embodiment of the present invention.
Figure 7:
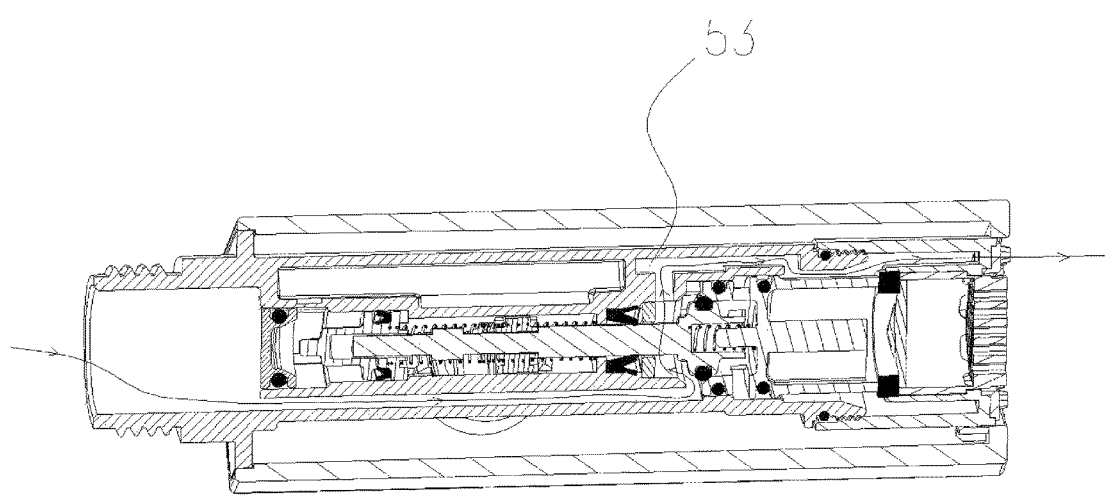
FIG. 7 is a flow diagram of the second state of a water discharge structure having a reset function in the first embodiment of the present invention.

Referring to FIGS. 6 and 7, when in a second state of the water discharge structure having a reset function, the work principle is provided below. The button is pressed in the condition of the first state, and the second inclined surface of the button is exactly matched with the third inclined surface of the movable element. Under the action of the button, the movable element forces the center shaft to move toward the right side until the blocking element on the center shaft blocks the first water outflow channel, so that the water does not flow out through the first water outflow channel. Under the action of the water pressure, when the water pressure applied on the blocking element is greater than the spring force of the third spring, the sealing element on the center shaft continuously blocks the first water outflow channel. At this moment, the first water outflow channel is closed, and the second water outflow channel is opened.

Figure 8:
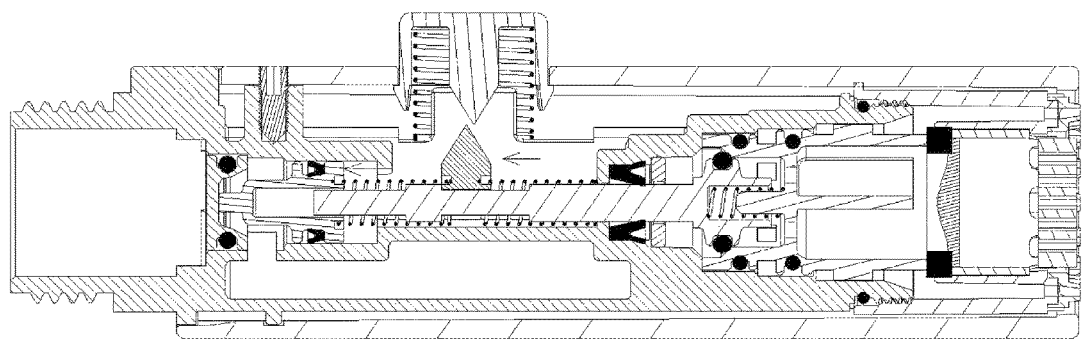
FIG. 8 is a schematic diagram of the third state of a water discharge structure having a reset function in the first embodiment of the present invention.
Figure 9:
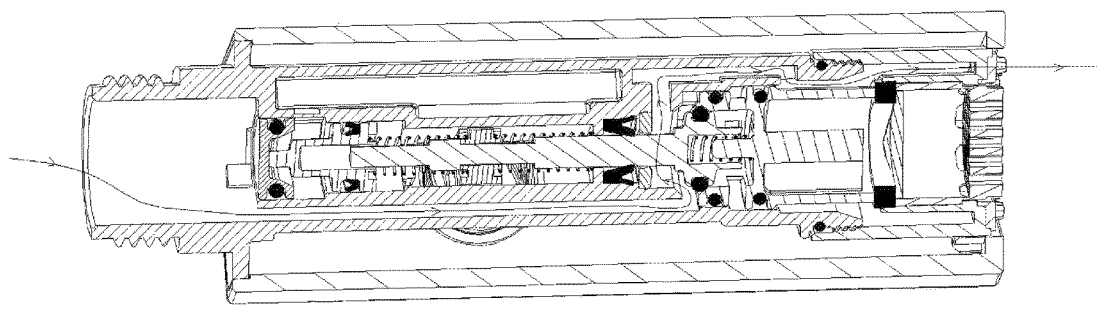
FIG. 9 is a flow diagram of the third state of a water discharge structure having a reset function in the first embodiment of the present invention.

Referring to FIGS. 8 and 9, when in a third state of the water discharge structure having a reset function, the work principle is provided below. The button is released in the condition of the second state, and the button is automatically reset under the action of the reset spring. The water pressure at the movable plug is released due to the closed first water outflow channel. At this moment, under the actions of the first spring and the second spring, the movable plug moves toward the left side until the limited position is reached.

Furthermore, under the actions of the first spring and the second spring, the movable element moves toward the left side, so that the first inclined surface is located above the fourth inclined surface to get ready to fit and be coupled.

Figure 10:
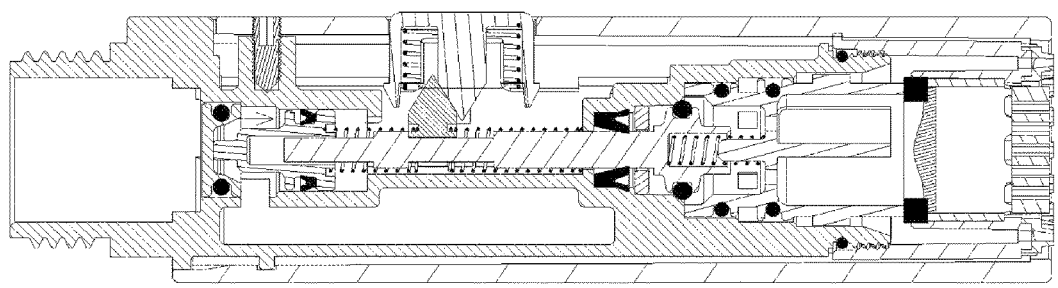
FIG. 10 is a schematic diagram of the fourth state of a water discharge structure having a reset function in the first embodiment of the present invention.
Figure 11:
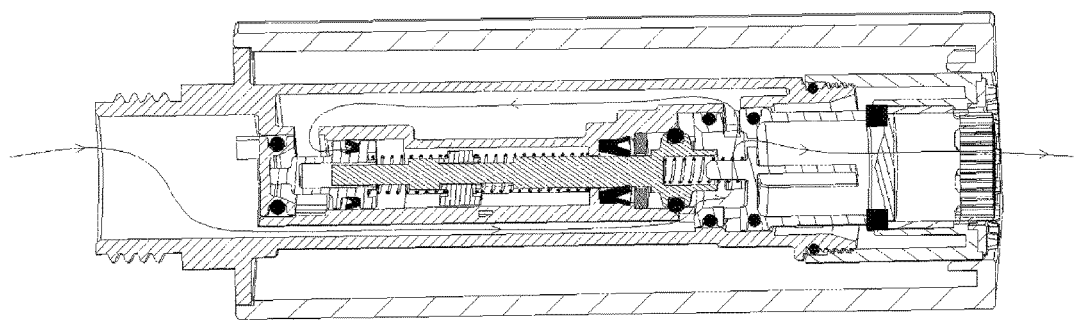
FIG. 11 is a flow diagram of the fourth state of a water discharge structure having a reset function in the first embodiment of the present invention.

Referring to FIGS. 10 and 11, when in a fourth state of the water discharge structure having a reset function, the work principle is provided below. The button is pressed again in the condition of the third state, the first inclined surface of the button is exactly matched with the fourth inclined surface of the movable element. The center shaft is forced to move toward the left side by the movable element, until the blocking element of the center shaft blocks the second water outflow channel. Under the actions of the water pressure and the third spring, the blocking element on the center shaft continuously blocks the second water outflow channel. The second water outflow channel is closed, the first water outflow channel is opened.

Figure 12:
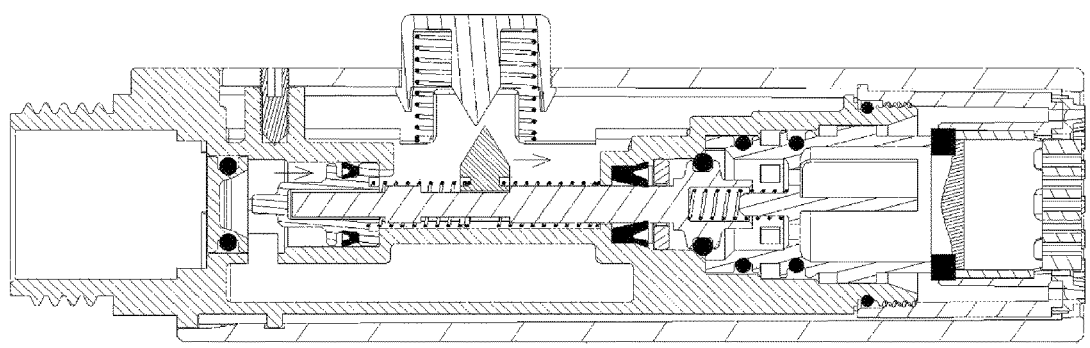
FIG. 12 is a schematic diagram of the fifth state of a water discharge structure having a reset function in the first embodiment of the present invention.
Figure 13:
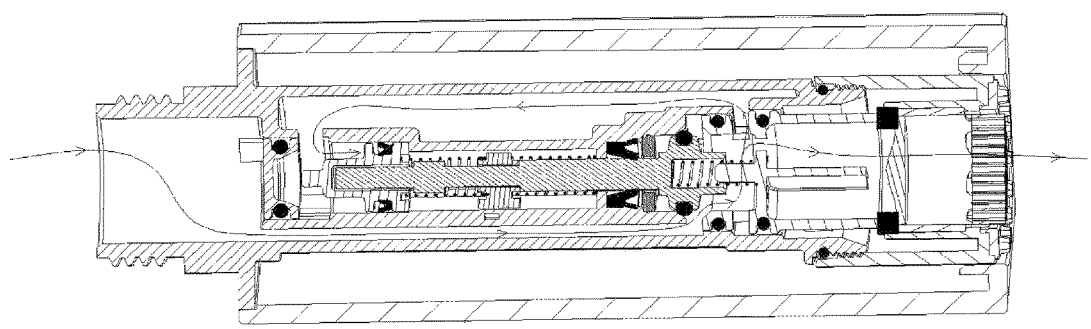
FIG. 13 is a flow diagram of the fifth state of a water discharge structure having a reset function in the first embodiment of the present invention.

Referring to FIGS. 12 and 13, when in the fifth state of the water discharge structure having a reset function, the work principle is provided below. The button is released in the condition of the fourth state, and the button is automatically reset under the action of the reset spring. Under the action of the water pressure, the movable plug moves toward the right side until the limited position is reached. The first spring and the second spring are compressed at the same time, and under the action of the first spring and the second spring, the movable element also moves toward the right side. At this moment, the product returns to the first state. The switching process is repeated in such a manner. If the water inflow port is closed at this time, the product automatically returns to the non-working state under the action of the spring force.

With reference to FIGS. 14 to 19, a second embodiment of the present invention is provided.

Figure 14:
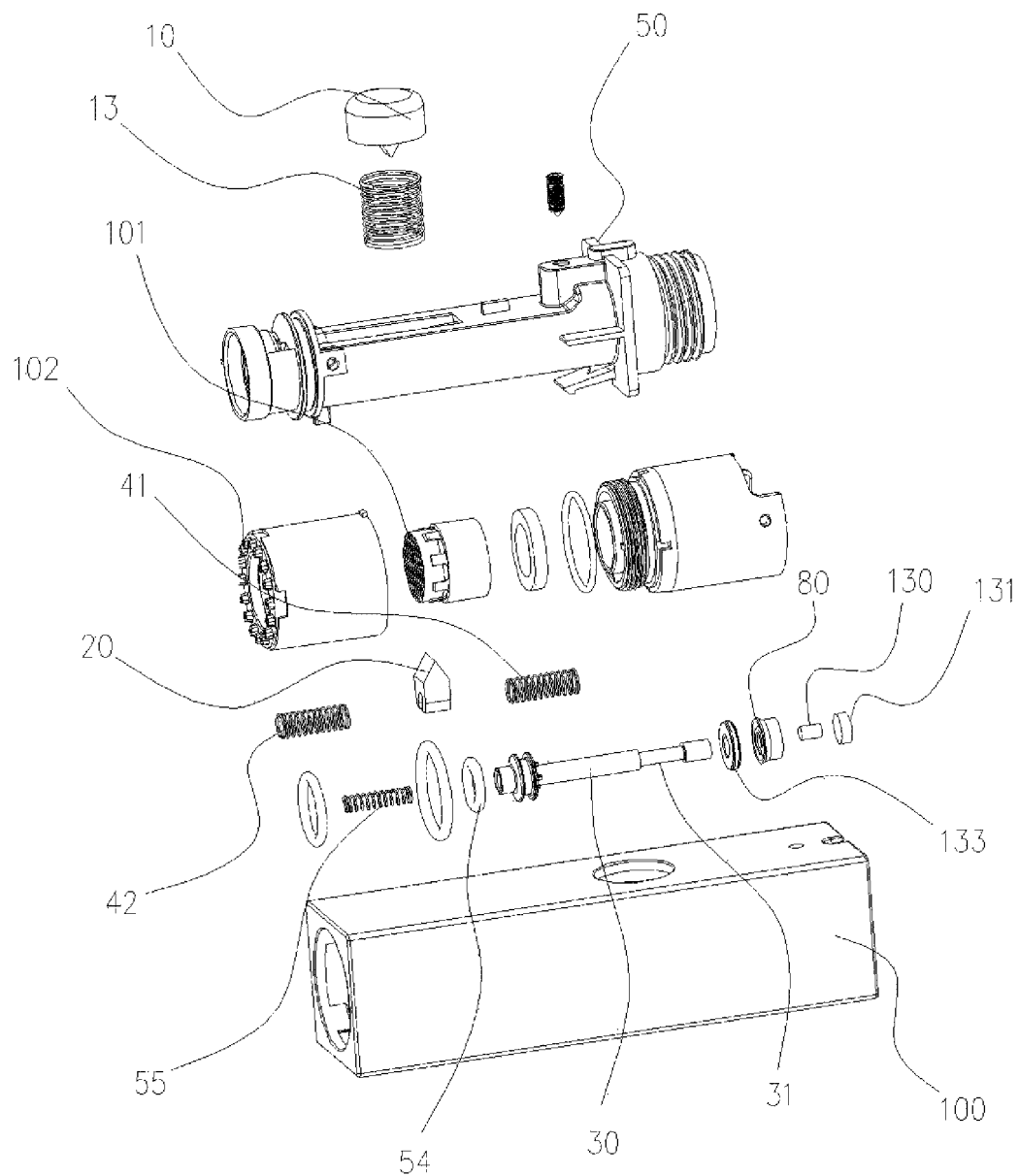
FIG. 14 is an exploded view of a water discharge structure in the second embodiment of the present invention.

Referring to FIG. 14, a water discharge structure having a reset function mainly includes button 10, movable piece 20, center shaft 30, and body 50. The specific products, to which the water discharge structure having a reset function is applied, are described hereafter. Taking a pull-out shower having a pull-out faucet as an example, the drawings are drawn to illustrate the water outflow structure. However, the water discharge structure provided by the present invention is not limited to the pull-out shower drawn in the drawings, and the water discharge structure may be used in other products, such as three-way flow dividers, switching of tap water and purified water, top sprays, showers, spray guns, and so on.

Specifically, in terms of button 10 in one embodiment, first inclined surface 11 and second inclined surface 12 are provided at the lower portion of the button at the left and right sides respectively. The lower ends of first inclined surface and second inclined surface are coupled with each other, and a third reset spring is provided on the button. For movable element 20, the movable element fits the button, third inclined surface 21 and fourth inclined surface 22 are provided at the upper portion of the movable element on the left and right sides respectively, and the upper ends of third inclined surface 21 and fourth inclined surface 22 are coupled with each other. Third inclined surface 21 fits second inclined surface 12, and fourth inclined surface 22 fits first inclined surface 11. In another embodiment, a first arc surface is provided at the lower portion of the button, a second arc surface is provided at the upper portion of movable element, and the second arc surface fits the first arc surface. One side of the first arc surface fits the other side of the second arc surface, and the other side of the first arc surface fits one side of the second arc surface. That is to say, the lowest point of the first arc surface is staggered with the highest point of the second arc surface, and the lowest point of the first arc surface and the highest point of the second arc surface are not in a same vertical plane. Since the fitting mode of the first arc surface and the second arc surface is similar to the fitting mode of the four above-mentioned inclined surfaces, the fitting mode will not be illustrated in detail herein. For center shaft 30, movable element 20 fits center shaft 30, so that the movable element moves along the center shaft. First spring 41 and second spring 42 are arranged around the center shaft located on the left and right sides of the movable element. In an embodiment, the center shaft is provided with annular recess 31. Movable element 20 is arranged within and around annular groove 31. In this embodiment, the movable element moves between both ends of the annular recess, namely, both ends of the annular recess are the moving terminals of the movable element.

More specifically, the water discharge structure further includes body 50 having water flowing channel 51. The water outflow end of the water flowing channel is provided with first water outflow channel 52 and second water outflow channel 53. In this embodiment, the water outflow end of the water flowing channel is provided with a flow divider. The first water outflow channel is located inside the first flow divider, and the second water outflow channel is located in a gap between the flow divider and the body. One end of the center shaft is provided with blocking element 54 to control the opening and closing of the first water outflow channel or the second water outflow channel. In one embodiment, the blocking element is a seal ring which is arranged around the center shaft. Third spring 55 is provided between one end of the center shaft and the body. The function of the third spring is to make the blocking element block the second water outflow channel after water is cut off for the product. When the water is supplied, water is discharged from the first water outflow channel, rather than from the second water outflow channel.

Furthermore, first magnet 130 is arranged around the other end of the center shaft. The body is further provided with magnetic element 131 which attracts and fits the first magnet. The body is provided with a space 132 where the magnetic element moves. That is to say, the magnetic element can move in the space along the left and right directions. In a specific embodiment of the present invention, one end of the first spring is coupled with one end of the movable element, and the other end of the first spring is coupled with the magnetic element. One end of the second spring is coupled with the other end of the movable element, and the other end of the second spring is coupled with the body.

During use of the present invention, the center shaft located in the first water outflow channel is provided with sealing element 80, and fixed ring 133 is arranged around the center shaft located between the sealing element and the blocking element.

The water discharge structure of the present invention will be described in detail hereinafter.

Figure 15:
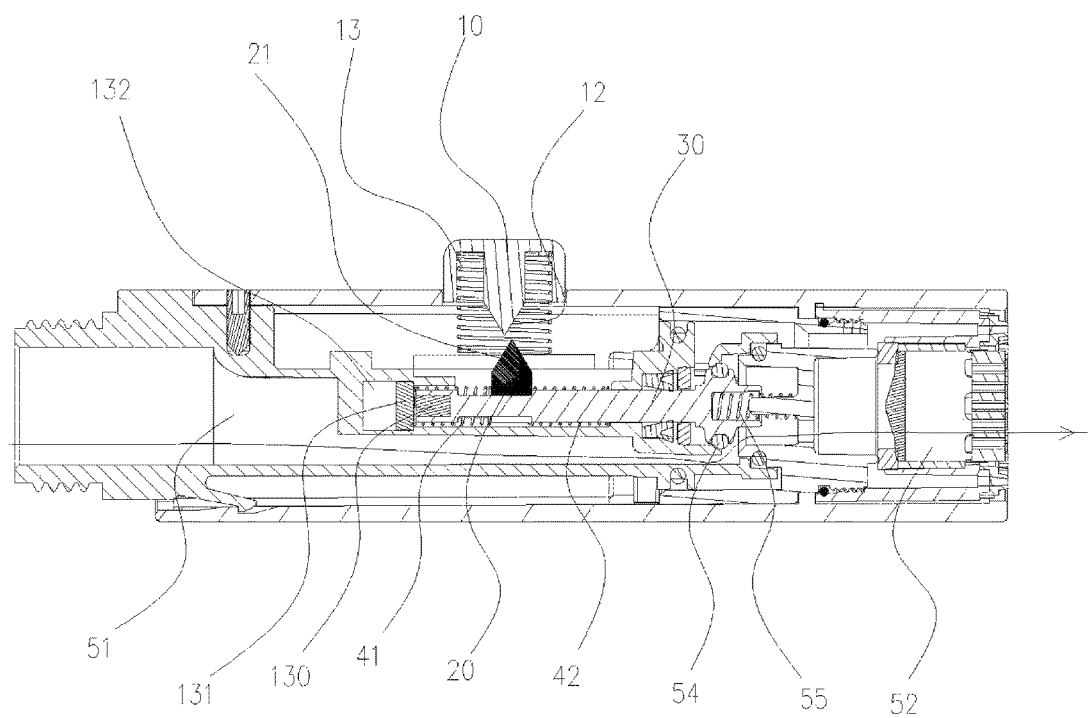
FIG. 15 is a schematic diagram of the first state of a water discharge structure having a reset function in the second embodiment of the present invention.

With reference to FIG. 15, when in the first state of the water discharge structure, the work principle is provided below. The button is not pressed for switching (reset state). The seal ring around the center shaft blocks the second water outflow channel under the action of the third spring, while the first magnet moves to the limited position under the action of the attractive force of the magnetic element. The first spring is compressed under the action of the first magnet. Under actions of the first spring and the second spring, the highest point of the movable element is located at the right side of the lowest point of the button. The second inclined surface is located above the third inclined surface to get ready to fit. At this time, the first water outflow channel is opened.

Figure 16:
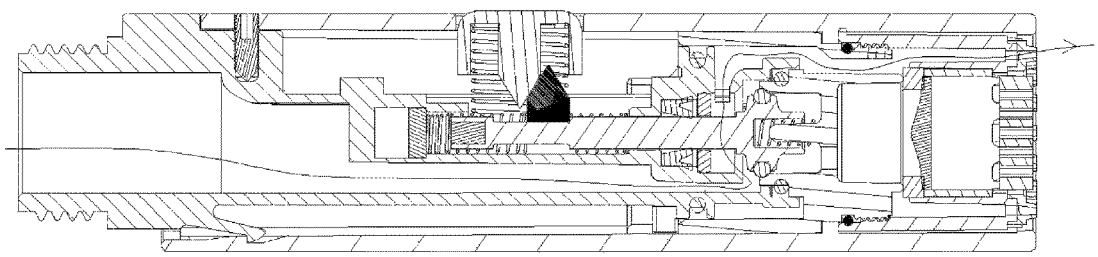
FIG. 16 is a schematic diagram of the second state of a water discharge structure having a reset function in the second embodiment of the present invention.

Referring to FIG. 16, when in the second state of the water discharge structure, the work principle is provided below. In the condition of the first state, after the button is pressed, the second inclined surface of the button is exactly matched with the third inclined surface of the movable element. The center shaft is forced to move toward the right side in the figure by the movable element under the action of the button, until the blocking element of the center shaft closes the first water outflow channel and opens the second water outflow channel. However, under the action of the water pressure, when the water pressure is greater than the spring force of the third spring, the blocking element of the center shaft ensures that the first water outflow channel is closed and the second water outflow channel is unblocked.

Figure 17:
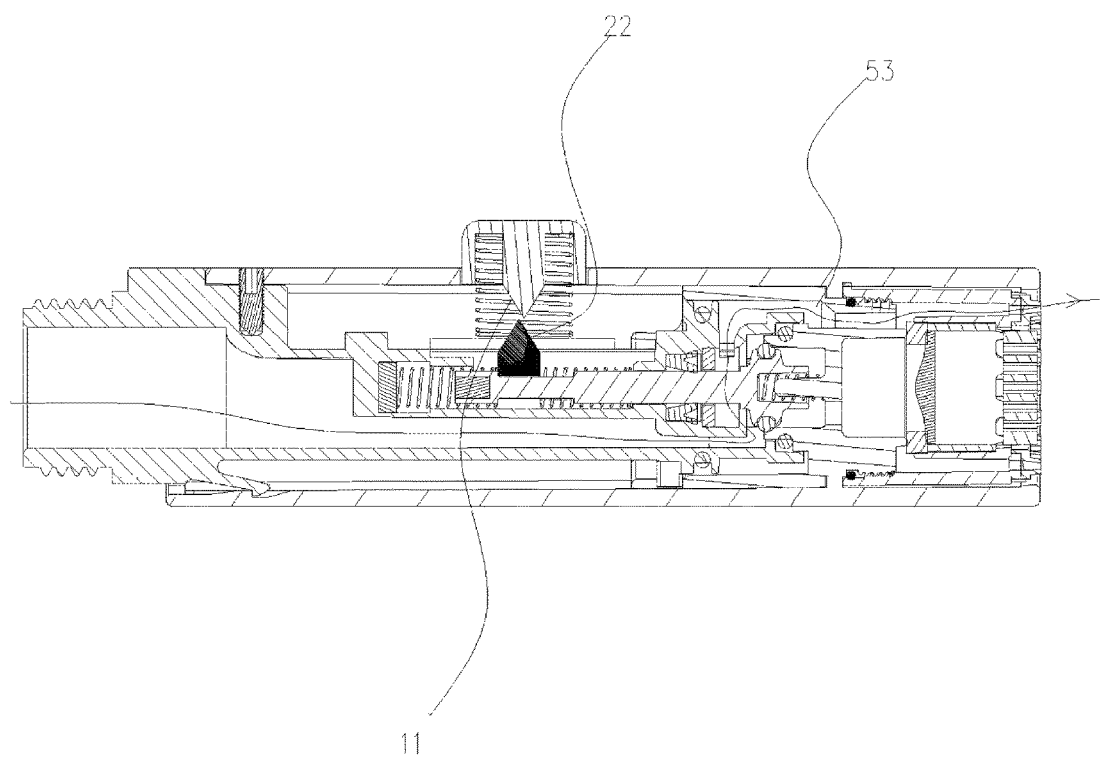
FIG. 17 is a schematic diagram of the third state of a water discharge structure having a reset function in the second embodiment of the present invention.

Referring to FIG. 17, when in the third state of the water discharge structure, the work principle is provided below. In the second state, the button is released, and under the action of the reset spring, the button is automatically reset. When the first magnet and the magnetic element are separated away for a certain distance, the mutual attractive force is reduced, meanwhile, the spring force of the first spring applied on the first magnet is increased, so that the first magnet moves toward the left side in the figure until the limited position is reached. Moreover, the movable element also moves due to the actions of the first spring and the second spring until the highest point of the movable element is located on the left side of the lowest point of the button. Furthermore, the first inclined surface is located above the fourth inclined surface to get ready to fit.

Figure 18:
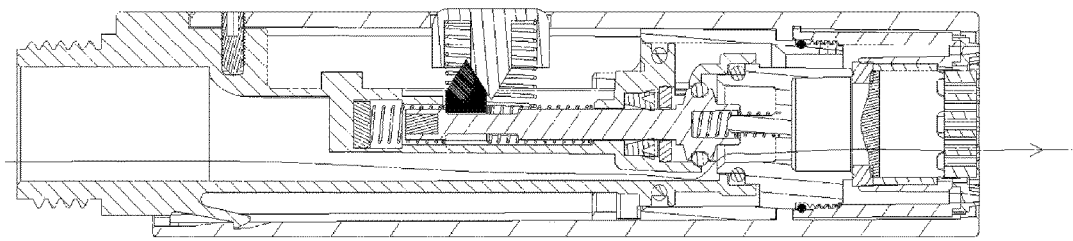
FIG. 18 is a schematic diagram of the fourth state of a water discharge structure having a reset function in the second embodiment of the present invention.

Referring to the FIG. 18, when in the fourth state of the water discharge structure, in the condition of the third state, the button is pressed again, and the first inclined surface of the button is exactly matched with the fourth inclined surface of the movable element. The center shaft is forced to move toward the left side in the figure by the movable element until the blocking element of the center shaft closes the second water outflow channel. However, under the action of the water pressure, the blocking element of the center shaft ensures that the second water outflow channel is closed and the first water outflow channel is opened.

Figure 19:
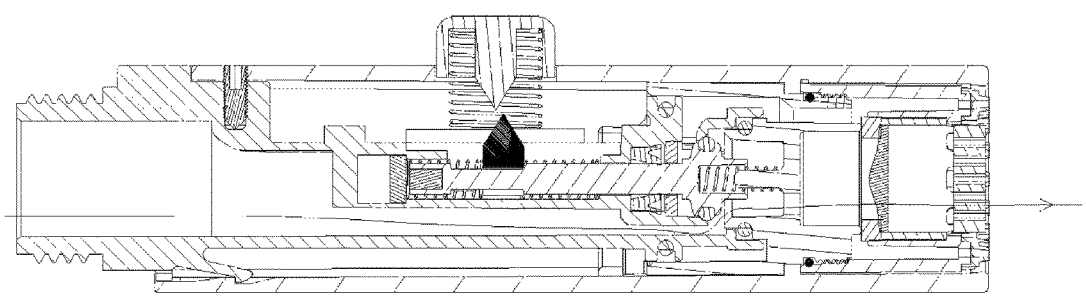
FIG. 19 is a schematic diagram of the fifth state of a water discharge structure having a reset function in the second embodiment of the present invention.

Referring to FIG. 19, when in the fifth state of the water discharge structure (also the first state), in the condition of the fourth state, when the button is released, the button is automatically reset under the action of the reset spring, while the first magnet moves to the limited position due to the attraction of the magnetic element. Moreover, under the actions of the first spring and the second spring, the highest point of the movable element is located on the right side of the lowest point of the button, and the second inclined surface is located above the third inclined surface. The switching process is repeated in such a manner.

With reference to FIGS. 20 to 27, a third embodiment of the present invention is provided.

Figure 20:
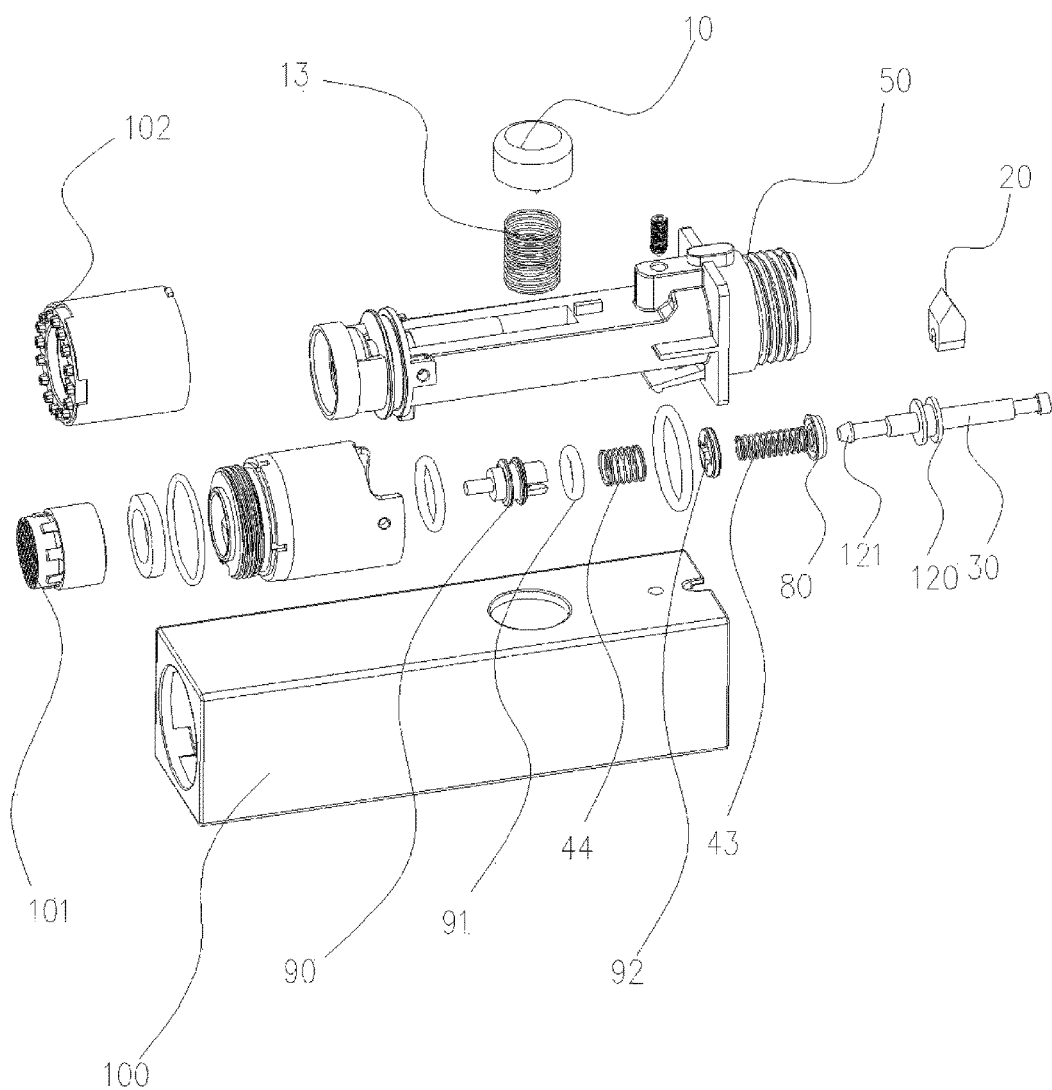
FIG. 20 is an exploded view of a water discharge structure having a reset function in the third embodiment of the present invention.
Figure 21:
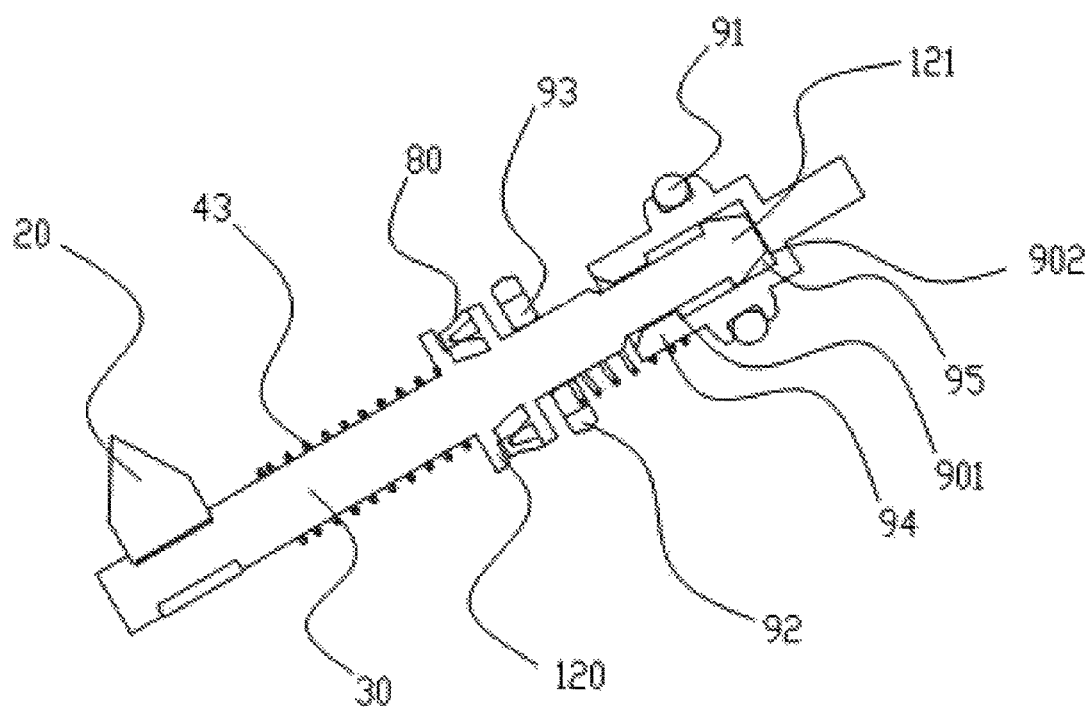
FIG. 21 is a schematic view showing the match of the center shaft in the third embodiment of the present invention.

Referring to FIG. 20, a water discharge structure having a reset function mainly includes button 10, movable element 20, center shaft 30 and body 50.

The specific products, to which the water discharge structure having a reset function is applied, are described hereafter. Taking a pull-out shower having a pull-out faucet as an example, the drawings are drawn to illustrate the water discharge structure. However, the water discharge structure provided by the present invention is not limited to the pull-out shower drawn in the drawings, the water discharge structure having the reset function may be used in other products, such as three-way flow dividers, switching of tap water and purified water, top sprays, showers, spray guns, and so on.

As to button 10, the button is provided with reset spring 13, and the reset spring 13 fits the button.

As to movable element 20, the movable element is coupled with and fits the button to realize the movement of the button.

As to center shaft 30, the movable element is fixed at one end of the center shaft, and fourth spring 43 is arranged around the center shaft.

In an embodiment of the button of the present invention, first inclined surface 11 and second inclined surface 12 are provided at the lower portion of the button on the left and right sides respectively, and the lower ends of first inclined surface and second inclined surface are coupled with each other. Third inclined surface 21 and fourth inclined surface 22 are provided at the upper portion of the movable element on the left and right sides respectively, and the upper ends of third inclined surface 21 and fourth inclined surface 22 are coupled with each other. Third inclined surface fits second inclined surface, and fourth inclined surface fits first inclined surface. Annular piece 120 is arranged at the middle of the center shaft, and fourth spring 43 is arranged between the annular piece and the body. In another embodiment of the button of the present invention, a first arc surface is provided at the lower portion of the button, a second arc surface is provided at the upper portion of movable element, and the second arc surface fits the first arc surface. One side of the first arc surface fits the other side of the second arc surface, and the other side of the first arc surface fits one side of the second arc surface. That is to say, the lowest point of the first arc surface is staggered with the highest point of the second arc surface, and the lowest point of the first arc surface and the highest point of the second arc surface are not in a same vertical plane. Since the fitting mode of the first arc surface and the second arc surface is similar to the fitting mode of the four above-mentioned inclined surfaces, the fitting mode will not be illustrated in detail herein.

More specifically, a body is further included, and the body is provided with water flowing channel 51. The water outflow end of the body is provided with first water outflow channel 52 and second water outflow channel 53. The other end of the center shaft is coupled with center plug 90. The center plug is provided with seal ring 91 for controlling the opening and closing of the first water outflow channel or the second water outflow channel. Fixing piece 92 is arranged around the center shaft located between the annular piece and the center plug, and the fixing piece is fastened to the body. Fifth spring 44 is arranged between the fixing piece and the center plug. More specifically, water flowing port 93 is arranged between the fixing piece and the center shaft, and the water flowing port 93 is configured to guide the water flow to the annular piece. More specifically, the water can flow to the other side via the fixing piece, so that the formed water pressure pushes the center shaft to move toward the left side. In a preferred embodiment of the present invention, the blocking element is a movable center plug. The center plug includes body 94, seal ring 91 is peripherally arranged around the body. The body is internally provided with cavity 95. The other end of the center shaft is provided with clamping block 121 located inside the cavity. The length of the clamping block is less than that of the cavity. Specifically, when the center shaft located in a rightmost position is moving toward the left side, or the center shaft located in a leftmost position is moving toward the right side, firstly, the center shaft will move with one travel independently, then the center shaft drives the center plug to move together subsequently. This is because the center shaft needs a travel to reset, so as to get ready for the next switching.

During use of the present invention, the annular piece is provided with sealing element 80.

The water discharge structure of the present invention will be described in detail hereinafter.

Figure 22:
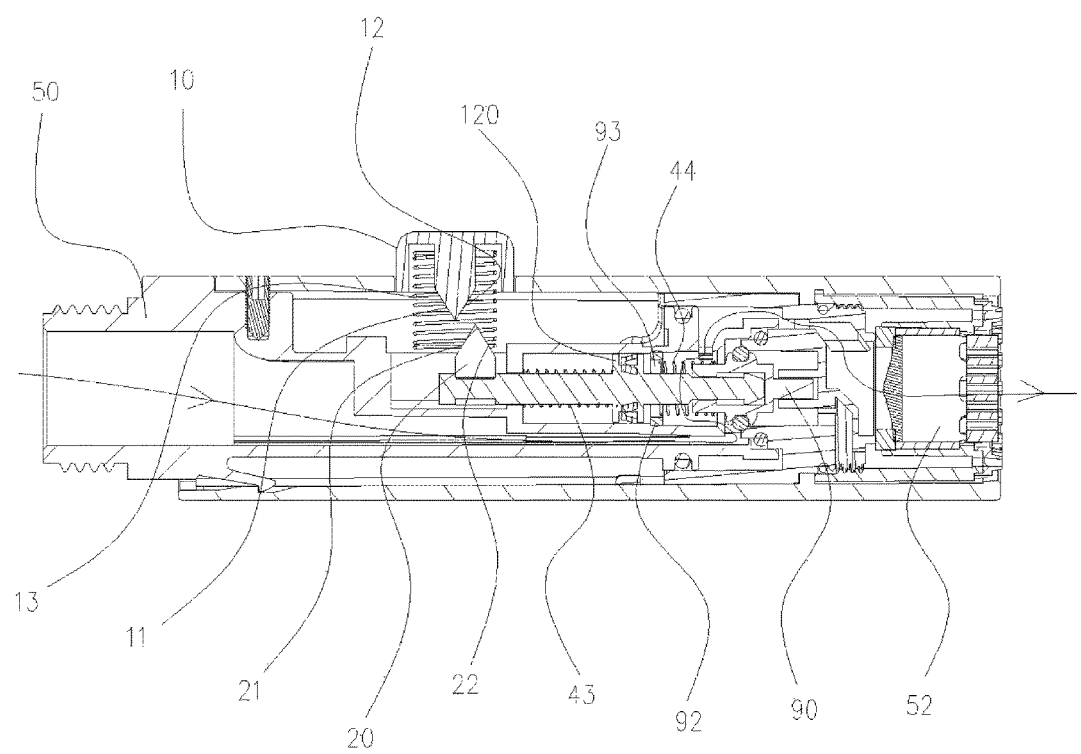
FIG. 22 is a schematic diagram of a water discharge structure having a reset function while not at work in the third embodiment of the present invention.

Referring to FIG. 22, when the water discharge structure is not at work, the work principle is provided below. Under the action of the fifth spring, the seal ring on the center plug blocks the second water outflow channel, and opens the first water outflow channel. The movable element is fixed on the center shaft. Under the action of the fourth spring, the lowest point of the button is located on the left side of the highest point of the movable element, and the second inclined surface is located above the third inclined surface.

Figure 23:
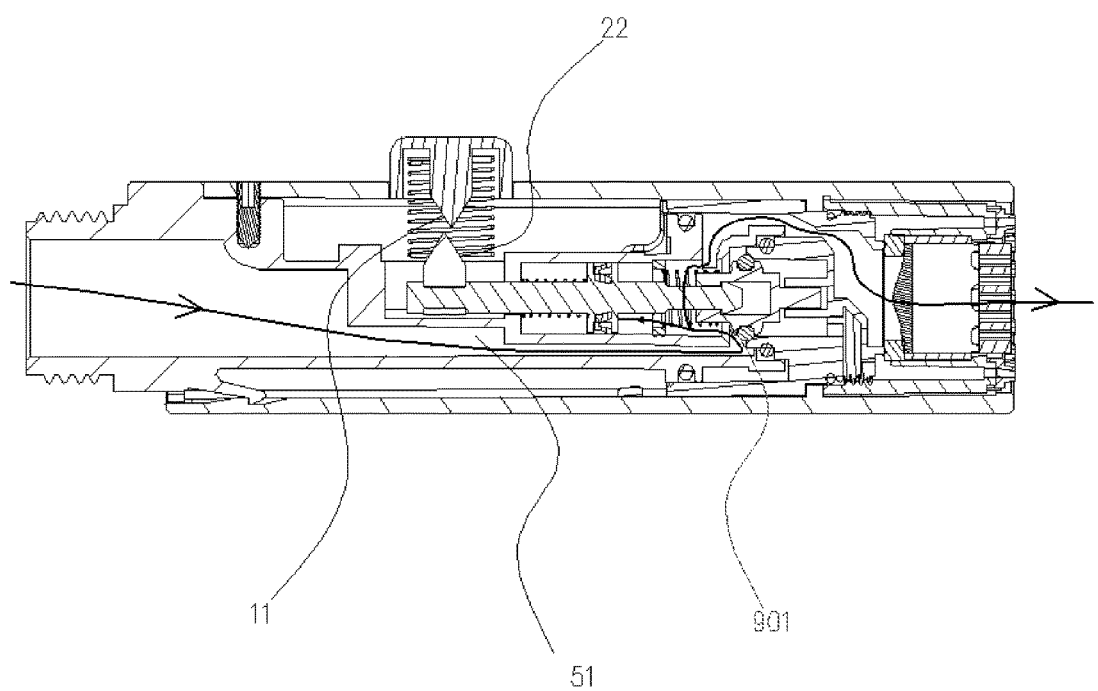
FIG. 23 is a schematic diagram of the first state of a water discharge structure having a reset function in the third embodiment of the present invention.

With reference to FIG. 23, when in the first state of the water discharge structure, the work principle is provided below. The button is not pressed (reset state). The seal ring on the center plug blocks the second water outflow channel and opens the first water outflow channel under the action of the fifth spring, while the center shaft moves toward the left side in the figure under the action of the water pressure until the limited position 901 is reached. The fourth spring is compressed under action of the center shaft, while the movable element and the center shaft move toward the left side under the action of the water pressure. The lowest point of the button is located on the right side of the highest point of the movable element. The first inclined surface is located above the fourth inclined surface to get ready to fit.

Figure 24:
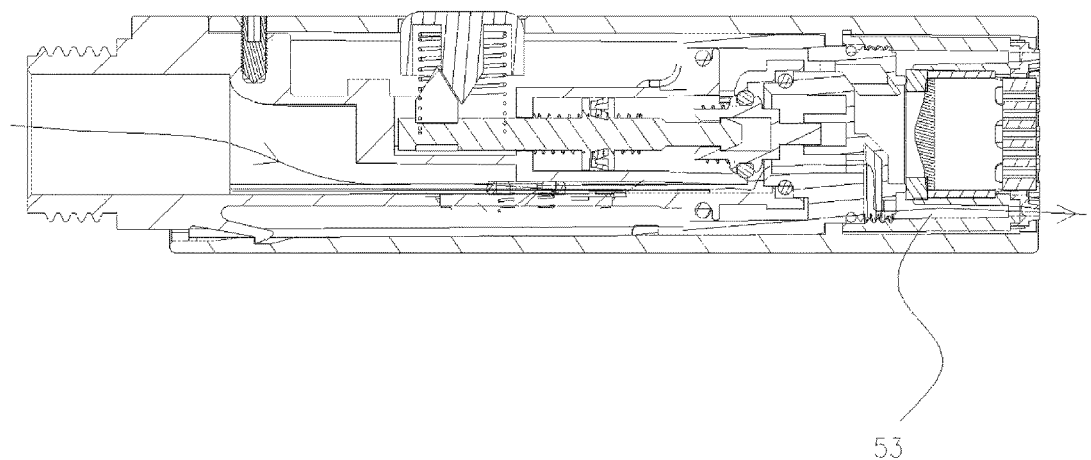
FIG. 24 is a schematic diagram of the second state of a water discharge structure having a reset function in the third embodiment of the present invention.

Referring to FIG. 24, when in the second state of the water discharge structure, the work principle is provided below. In the condition of the first state, after the button is pressed, the first inclined surface of the button is exactly matched with the fourth inclined surface of the movable element. The center shaft is forced to move toward the left side in the figure by the movable element and the center shaft under the action of the button, so as to pull the center plug to move toward the left side in the figure until the seal ring on the center plug blocks the first water outflow channel and opens the second water outflow channel. However, under the action of the water pressure, when the water pressure is greater than the spring force of the fifth spring, the seal ring on the center plug continuously blocks the second water outflow channel and opens the first water outflow channel.

Figure 25:
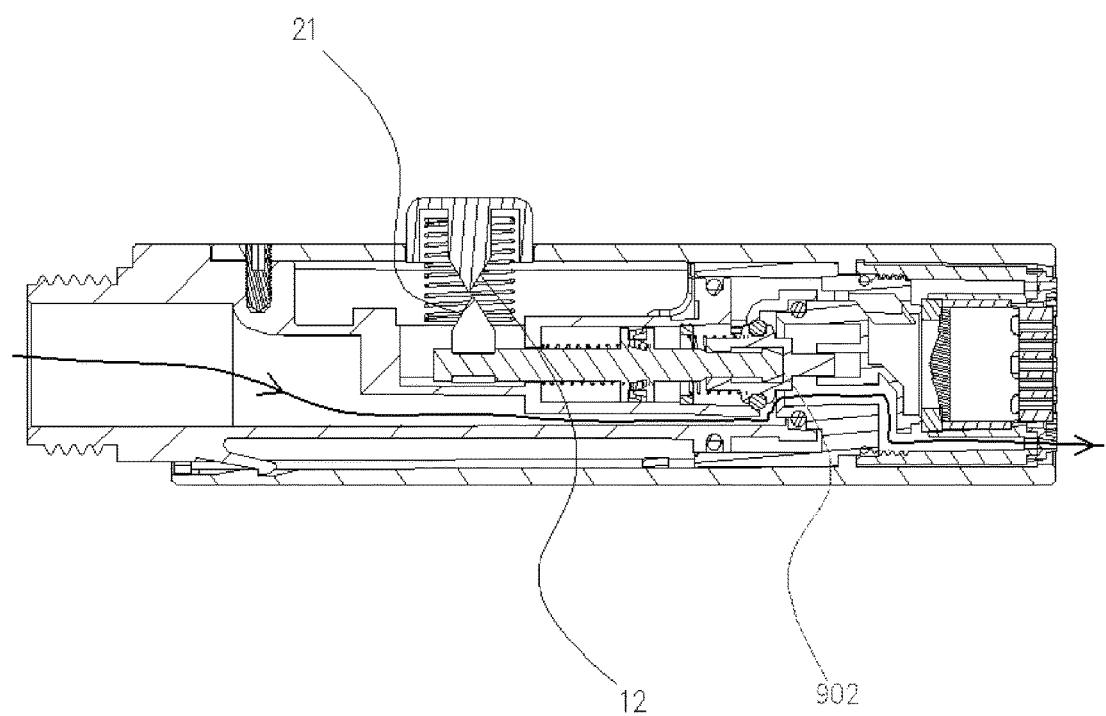
FIG. 25 is a schematic diagram of the third state of a water discharge structure having a reset function in the third embodiment of the present invention.

Referring to FIG. 25, when in the third state of the water discharge structure, the work principle is provided below. In the second state, the button is released, and the button is automatically reset under the action of the reset spring. The water pressure at the center shaft is released due to the closing of the first water outflow channel. At this time, under the action of the fourth spring, the center shaft moves toward the right side until the limited position 902 is reached. The lowest point of the button is located on the left side of highest point of the movable element. Furthermore, the second inclined surface is located above the third inclined surface to get ready to fit.

Figure 26:
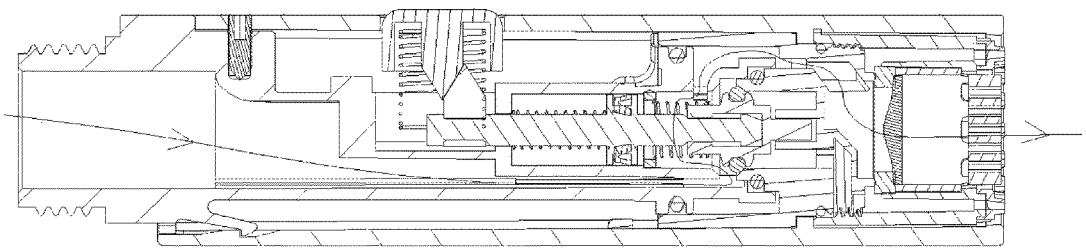
FIG. 26 is a schematic diagram of the fourth state of a water discharge structure having a reset function in the third embodiment of the present invention.

Referring to the FIG. 26, when in the fourth state of the water discharge structure, the work principle is provided below. In the condition of the third state, the button is pressed again, the second inclined surface of the button is exactly matched with the third inclined surface of the movable element. The center plug is forced to move toward the right side in the figure by the center shaft under the action of the movable element, so that the seal ring on the center plug blocks the second water outflow channel, and opens the first water outflow channel.

Figure 27:
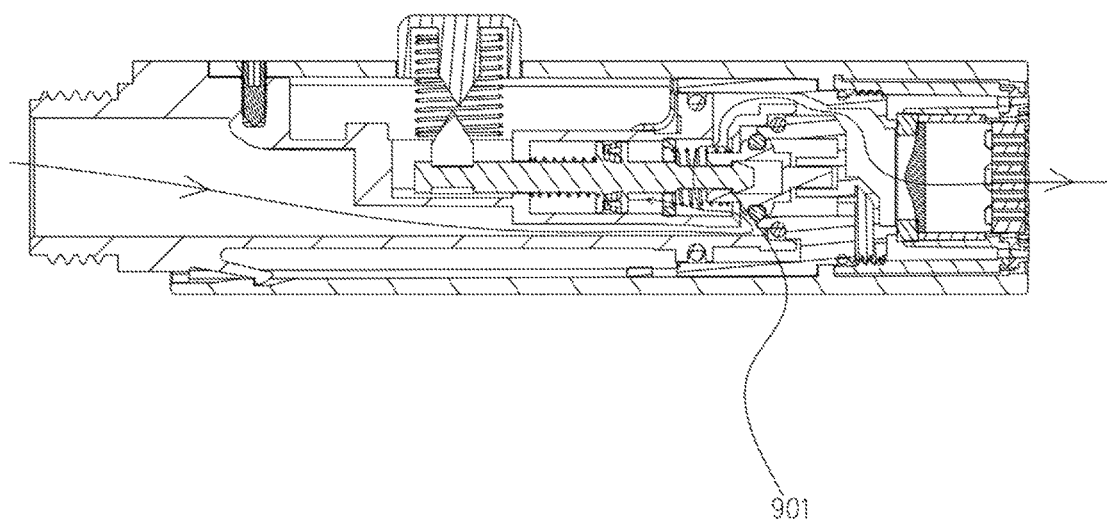
FIG. 27 is a schematic diagram of the fifth state of a water discharge structure having a reset function in the third embodiment of the present invention.

Referring to FIG. 27, when in the fifth state of the water discharge structure (also the first state), the work principle is provided below. In the condition of the fourth state, when the button is released, the button is automatically reset under the action of the reset spring, while the center shaft moves toward the left side in the figure under the action of the water pressure until the limited position 901 is reached. Meanwhile, the fourth spring is compressed, and the fourth spring is compressed under the action of the center shaft. The movable element and the center shaft move toward the left side under the action of the water pressure. The lowest point of the button is located on the right side of the highest point of the movable element. The first inclined surface is located above the fourth inclined surface to get ready to fit. At this time, the product is in the first state again. The switching process is repeated in such a manner. If the water inflow port is closed at this time, the product will return to non-working state automatically, such that the function of memory is realized.

The present invention also discloses another technical solution:

A pull-out head including the water discharge structure having the reset function as described above is provided. The pull-out head further includes housing 100 peripherally arranged around the body, and the housing is provided with aerator 101 connected to the first water outflow channel. The housing is provided with shower water outflow holes 102 connected to the second water outflow channel.

The foregoing description only discloses preferred embodiments of the present invention, and is apparently not intended to limit the scope of the invention. Therefore, the equivalents derived from the claims of the present invention still fall within the scope of the present invention.

What is claimed is:

1. A water discharge structure having a reset function comprising:
   a body, wherein the body is internally provided with a water flowing channel, and a water outflow end of the body is provided with a first water outflow channel and a second water outflow channel;
   a button, wherein the button is arranged on the body, and a reset spring is arranged between the button and the body;
   a movable element, wherein the movable element is coupled with and fits the button to realize movement of the movable element; and
   a center shaft, wherein the movable element is coupled with and fits the center shaft, the movable element is movable relative to the water discharge structure, an end of the center shaft is provided with a blocking element to control opening and closing of the first water outflow channel or the second water outflow channel, a third spring is provided between the end of the center shaft and the body, and the body is internally provided with a reset device to drive the movable element to reset, where the reset device comprises a first spring and a second spring, the first spring and the second spring are arranged around the center shaft located on both the left and right sides of the movable element.

2. The water discharge structure having a reset function of claim 1, wherein, a movable plug is arranged around another end of the center shaft; the body is further provided with a water channel to connect the first water outflow channel to the movable plug; a first end of the first spring is coupled with an end of the movable element, and a second end of the first spring is coupled with the movable plug; a first end of the second spring is coupled with another end of the movable element, and a second end of the second spring is coupled with the body.

3. The water discharge structure having a reset function of claim 1, wherein, the reset device further comprises a first magnet located at another end of the center shaft; the body is further provided with a magnetic element, and the magnetic element attracts the first magnet; the body is provided with a space in which the magnetic element moves; a first end of the first spring is coupled with an end of the movable element; a second end of the first spring is coupled with the magnetic element; a first end of the second spring is coupled with another end of the movable element; and a second end of the second spring is coupled with the body.

4. The water discharge structure having a reset function of claim 2, wherein, the center shaft is provided with an annular recess, and the movable element is arranged within and around the annular recess.

5. The water discharge structure having a reset function of claim 2, wherein, a first inclined surface and a second inclined surface are provided at a lower portion of the button on left and right sides of the button respectively; lower ends of the first inclined surface and the second inclined surface are coupled to each other; a third inclined surface and a fourth inclined surface are provided at an upper portion of the movable element on the left and right sides of the movable element respectively; upper ends of the third inclined surface and the fourth inclined surface are coupled to each other; and the third inclined surface fits the second inclined surface, the fourth inclined surface fits the first inclined surface.

6. The water discharge structure having a reset function of claim 1, wherein, a first arc surface is provided at a lower portion of the button, a second arc surface is provided at an upper portion of the movable element, and the second arc surface fits the first arc surface; a first side of the first arc surface fits a second side of the second arc surface, and a second side of the first arc surface fits a first side of the second arc surface.

7. The water discharge structure having a reset function of claim 2, wherein, the body is internally provided with a cavity for mounting the center shaft; a sealing element is provided between the movable plug and the cavity; another end of the sealing element is arranged around the center shaft located at another end of the cavity.

8. The water discharge structure having a reset function of claim 3, wherein, the center shaft located in the first water outflow channel is provided with a sealing element; a fixing ring is arranged around the center shaft located between the sealing element and the blocking element.

9. The water discharge structure having a reset function of claim 3, wherein, the center shaft is provided with an annular recess, and the movable element is arranged within and around the annular recess.

10. The water discharge structure having a reset function of claim 3, wherein, a first inclined surface and a second inclined surface are provided at a lower portion of the button on left and right sides of the button respectively; lower ends of the first inclined surface and the second inclined surface are coupled to each other; a third inclined surface and a fourth inclined surface are provided at a upper portion of the movable element on the left and right sides of the movable element respectively; upper ends of the third inclined surface and the fourth inclined surface are coupled to each other; and the third inclined surface fits the second inclined surface, the fourth inclined surface fits the first inclined surface.

11. The water discharge structure having a reset function of claim 1, wherein, a first inclined surface and a second inclined surface are provided at a lower portion of the button on left and right sides of the button respectively; lower ends of the first inclined surface and the second inclined surface are coupled to each other; a third inclined surface and a fourth inclined surface are provided at a upper portion of the movable element on the left and right sides of the movable element respectively; upper ends of the third inclined surface and the fourth inclined surface are coupled to each other; and the third inclined surface fits the second inclined surface, the fourth inclined surface fits the first inclined surface.

12. The water discharge structure having a reset function of claim 7, wherein, a first arc surface is provided at a lower portion of the button, a second arc surface is provided at an upper portion of the movable element, and the second arc surface fits the first arc surface; a first side of the first arc surface fits a second side of the second arc surface, and a second side of the first arc surface fits a first side of the second arc surface.

13. A pull-out head, comprising a water discharge structure having a reset function,
wherein the water discharge structure comprises,
a body, the body is internally provided with a water flowing channel, and a water outflow end of the body is provided with a first water outflow channel and a second water outflow channel;
a button, the button is arranged on the body, and a reset spring is arranged between the button and the body;
a movable element, wherein the movable element is coupled with and fits the button to realize movements of the movable element; and
a center shaft, the movable element is coupled with and fits the center shaft, the movable element is movable relative to the water discharge structure, an end of the center shaft is provided with a blocking element to control opening and closing of the first water outflow channel or the second water outflow channel, a third spring is provided between the end of the center shaft and the body, and the body is internally provided with a reset device to drive the movable element to reset, the reset device comprises a first spring and a second spring, the first spring and second spring are arranged on the center shaft located on both the left and right sides of the movable element.

14. The pull-out head of claim 13, further comprising a housing peripherally provided around the body, the housing is provided with an aerator connected to the first water outflow channel; and the housing is provided with a plurality of shower water outflow holes connected to the second water outflow channel.

15. The water discharge structure having a reset function of claim 9, wherein, a first arc surface is provided at a lower portion of the button, a second arc surface is provided at an upper portion of the movable element, and the second arc surface fits the first arc surface; a first side of the first arc surface fits a second side of the second arc surface, and a second side of the first arc surface fits a first side of the second arc surface.

16. The pull-out head of claim 13, wherein, a movable plug is arranged around another end of the center shaft; the body is further provided with a water channel to connect the first water outflow channel to the movable plug; a first end of the first spring is coupled with an end of the movable element, and a second end of the first spring is coupled with the movable plug; a first end of the second spring is coupled with another end of the movable element, and a second end of the second spring is coupled with the body.

17. The pull-out head of claim 13, wherein, the reset device further comprises a first magnet located at another end of the center shaft; the body is further provided with a magnetic element, and the magnetic element attracts the first magnet; the body is provided with a space in which the magnetic element moves; a first end of the first spring is coupled with an end of the movable element; a second end of the first spring is coupled with the magnetic element; a first end of the second spring is coupled with another end of the movable element; and a second end of the second spring is coupled with the body.

18. The pull-out head of claim 16, wherein, the center shaft is provided with an annular recess, and the movable element is arranged within and around the annular recess.

\* \* \* \* \*